US006225262B1

(12) United States Patent
Irwin et al.

(10) Patent No.: US 6,225,262 B1
(45) Date of Patent: May 1, 2001

(54) ENCAPSULATED BREAKER SLURRY COMPOSITIONS AND METHODS OF USE

(75) Inventors: Michael J. Irwin, London; David J. Muir, Dorchester, both of (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/087,282

(22) Filed: May 29, 1998

(51) Int. Cl.[7] ..................... C09K 7/02; B32B 5/00

(52) U.S. Cl. ..................... 507/203; 507/201; 507/267; 507/276; 166/270; 166/300; 428/403; 428/404; 428/407

(58) Field of Search ..................... 507/201, 203, 507/267, 276, 922, 921; 428/404, 407, 403; 166/270, 300

(56) References Cited

U.S. PATENT DOCUMENTS

| | | | | |
|---|---|---|---|---|
| 4,016,931 | * | 4/1977 | Cryar, Jr. | 166/276 |
| 4,452,861 | | 6/1984 | Okamoto | 428/402.24 |
| 4,506,734 | | 3/1985 | Nolte | 166/308 |
| 4,741,401 | | 5/1988 | Walles | 166/300 |
| 5,128,390 | * | 7/1992 | Murphey et al. | 523/130 |
| 5,164,099 | | 11/1992 | Gupta | 252/8.551 |
| 5,187,011 | | 2/1993 | Manalastas et al. | 428/402.24 |
| 5,420,174 | * | 5/1995 | Dewprashad | 523/130 |
| 5,591,700 | | 1/1997 | Harris | 507/204 |
| 5,806,597 | * | 9/1998 | Tjon-Joe-Pin et al. | 166/300 |

FOREIGN PATENT DOCUMENTS

| | | | |
|---|---|---|---|
| 0 275 624 | 7/1988 | (EP) | E21B/43/26 |
| 0 379 236 | 7/1990 | (EP) | E21B/43/26 |

OTHER PUBLICATIONS

Kante et al. (Int. J. Pharm., 1980, 7, 45.).

* cited by examiner

*Primary Examiner*—Lyle A. Alexander
*Assistant Examiner*—LaToya I. Cross
(74) *Attorney, Agent, or Firm*—Dale A. Bjorkman

(57) ABSTRACT

An encapsulated breaker slurry composition for reducing the viscosity of a fracturing fluid. The slurry has a flashpoint above 93° C., and the liquid of the slurry does not facilitate release of the breaker from the coating. Methods of using the slurry composition are also described.

12 Claims, No Drawings

ENCAPSULATED BREAKER SLURRY COMPOSITIONS AND METHODS OF USE

FIELD OF INVENTION

This invention relates to encapsulated breakers. More specifically, this invention relates to slurries of encapsulated breakers.

BACKGROUND OF THE INVENTION

Hydraulic fracturing of oil subterranean formations is a well known technique for increasing the permeability of subterranean formations. In this technique, a viscous fluid ("fracturing fluid," commonly an aqueous fracturing fluid, most commonly guar) is introduced to the wellbore, pressure is applied to induce fracture, and proppants in the fluid (most commonly sand) maintain the fractures in an open state. The viscous fluid must then be removed, and oil is harvested from the thus opened subterranean formation. In order to facilitate the quick removal of the fracturing fluid, chemicals are used to reduce or "break" the viscosity of the fracturing fluid; these chemicals (most commonly oxidizers, and in particular persulfates) are known as "breakers." The chemical reaction of the breaker with the fracturing fluid is undesirable prior to completion of the fracturing operation. Therefore, it is advantageous to encapsulate or coat the particles with a polymer to delay the release of the breaker, and hence to delay the breaking of the fracturing fluid.

Many materials have been used in the art to encapsulate breakers for fracturing fluids. For example, U.S. Pat. No. 4,506,734 (Nolte) describes a breaker within a crushable glass or ceramic coat that ruptures upon closure of the induced fractures. U.S. Pat. No. 4,741,401 (Walles, et.al.) teaches that a polymer can be applied to a solid breaker chemical, most preferably by air suspension coating. The polymers of Walles are most typically homopolymers and copolymers of polyolefin and ethylene oxides. This patent describes the release of the breaker by rupture of the membrane, either by the force of closure of the fractures within the subterranean formation or by the osmotic pressure of water diffusing into the shell. In U.S. Pat. No. 5,164,099 (Gupta, et.al.), a polymer is applied to a solid particle of a breaker chemical by interfacial polymerization. Typically, this polymer is a polyamide or a crosslinked cellulosic material. This patent states that breaker is released from the capsules described therein by diffusion through the membrane of the encapsulation.

U.S. Pat. No. 5,591,700 (Harris, et.al.) relates to encapsulated breakers that are coated by surfactants that are solid at ambient surface conditions and which dissolve at elevated temperatures in the subterranean formation. The surfactants are mixed in from the dry state.

Alkyl-2-cyanoacrylate monomers polymerize immediately in the presence of a weak base, and as such have been widely used for encapsulation and particle coating in the pharmaceutical industry, primarily for the purpose of drug delivery. For example, Kante et al. (Int. J. Pharm., 1980, 7, 45.) have described a method for preparing actinomycin D nanoparticles using poly(butylcyanoacrylate).

U.S. Pat. No. 4,452,861 (to RCA Corporation) describes a method for coating luminescent, inorganic phosphors using polymeric cyanoacrylates. The procedure outlined involves a five stage process which requires complete evaporation of the nonaqueous solvent during each of the coating stages and a final step which calls for washing of the coated particles.

SUMMARY OF THE INVENTION

An encapsulated breaker slurry composition is provided for reducing the viscosity of a fracturing fluid. The breaker is enclosed within a coating and is provided as a slurry, together with a liquid that is selected such that the overall slurry has a flashpoint above 93° C. The liquid is also selected such that it does not facilitate release of the breaker from the coating. The slurry also contains a suspension aid in an amount sufficient to maintain the suspension of the encapsulated breaker in the liquid. Methods of use of these encapsulated breaker slurry compositions are also provided.

DETAILED DESCRIPTION OF THE INVENTION

While certain encapsulated breakers have been utilized before in the prior art, a new format for delivery of encapsulated breakers has been discovered, which format provides surprising advantages over previous formats. It has been found that providing encapsulated breakers in a slurry format has distinct advantages, because these compositions are easier to ship, mix and pump than prior art compositions. Because the slurry composition preferably contains surfactant, the fracturing fluid will readily flow from the fractured formation after breaking, and thereby provides easier cleanup of the subterranean formation.

The slurry compositions of the present invention are easy to handle at the pumping site because there is no need to use solid metering devices. Time is thereby saved at the work site because liquids mix faster, more completely and easier than solids with liquids. Because the breaker in a slurry composition may be more readily and completely mixed with the fracturing fluid, the breaker will be more uniformly distributed in the fluid pumped downhole, and will thereby also be more effective in completely breaking the fracturing fluid in even the remotest parts of the subterranean formation.

As an additional advantage, the slurry format allows the user to greatly simplify their logistics in maintaining work supplies. Because the materials may now be provided in a simple to use, stable, premixed format, the number of components that must be ordered and kept in inventory and or supply at the drilling site by the user may be substantially reduced. Further, the likelihood of error on the part of workers at the site in mismeasuring or improperly mixing components is substantially reduced as well.

Providing the encapsulated breaker in a slurry format allows the optional surfactant to be present in an available liquid phase at time of mixing with the fracturing fluid. This format aids in providing easy and complete mixing of the breaker throughout the fracturing fluid.

Additionally, because the encapsulated breaker is provided as a slurry for mixing with the fracturing fluid, the material to be pumped downhole is more homogeneous in distribution of both the breaker and any surfactant in the composition. Use of the present invention therefore may result in fewer agglomeration problems, especially downhole, while removing the fracturing fluid from the formation, because the breaker is available throughout the fracturing fluid and the surfactant is available at the site of the breaker to assist in removal of agglomerates in the broken fracturing fluid from the formation.

The preferred breaker material for aqueous-based fracturing fluids can comprise, for example, enzymes such as hemicellulase, oxidizers such as sodium or ammonium persulfate, organic acids or salts, such as citric acid or a citrate, fumaric acid, liquids adsorbed on a solid substrate, solid perborates, solid peroxides or other oxidizers, mixtures of two or more materials and the like. Most preferably, the breaker material is potassium persulfate. For gelled hydrocarbon fracturing fluids, preferred breakers include calcium oxide, calcium hydroxide, p-nitrobenzoic acid, triethanolamine, sodium acetate, sodium bicarbonate, and the like.

The coating of the encapsulated breaker is any coating suitable for protecting the breaker from premature reaction with the fracturing fluid, while providing an appropriate release mechanism to allow the breaker to reduce the viscosity of the fracturing fluid in the desired time frame, thereby allowing removal of material from the subterranean formation. Examples of suitable coating materials include glass coatings, ceramic coatings, homopolymers and copolymers of polyolefin and ethylene oxides, polyamides, crosslinked cellulosic materials, polyureas, polyurethanes, dehydrated gums (such as guar), surfactant coatings, and the like.

The encapsulated breaker of the present invention is preferably enclosed within a hydrolytically degradable polymer coating. By “hydrolytically degrade” is meant that the polymer coating will react with water to chemically break down the polymer coating to predominantly non-solid components in a time and temperature range appropriate for the intended use. Preferably, the coating will hydrolytically degrade within four hours at 70° C. An encapsulated breaker having a coating that hydrolytically degrades is superior to prior art systems, because it allows better control of release time and ease of handling not previously afforded by prior art systems. Because the breaker is encapsulated in a material that reacts with water, rather than simply dissolves or dissipates in water, the release can be controlled by reaction rate of the coating with water. Preferred encapsulated breakers of this type are disclosed in an application entitled ENCAPSULATED BREAKERS, COMPOSITIONS AND METHODS OF USE filed on even date with this application, which is hereby incorporated by reference.

The preferred polymer shell material of the present invention is primarily a poly(alkyl-2-cyanoacrylate), which is present in an amount sufficient to allow the coating to hydrolytically degrade at temperatures of use above room temperature. Preferably, the poly(alkyl-2-cyanoacrylate) is at least about 50% by weight of the total content of the coating, more preferably at least about 70% and most preferably at least about 90%. Other materials that may be incorporated into the coating of the present material include comonomers that are copolymerizable with alkyl-2-cyanoacrylate.

The liquid of the present slurry compositions is selected such that the overall slurry has a flashpoint above 93° C. for transport safety considerations as measured according to ASTM D 93-90 (the standard test method for flashpoint by Pensky-Martens, closed tester.) In the case of solvents that have flashpoints that are too low, the effective flashpoint of the slurry composition may be adjusted by mixing solvents. The slurry therefore will be considered to be safe for transport from a flammability and combustibility perspective.

The liquid is further selected such that it does not facilitate release of the breaker from the coating. Thus, the liquid will not cause diffusion of the breaker out of the encapsulation shell; diffusion of the liquid into the capsule, thereby causing rupture and release of the breaker prematurely; dissolution of the encapsulating shell; degradation of the encapsulation shell; or initiate any other release mechanism.

Optionally, the liquid of the slurry composition may comprise an oily or waxy material to further control the time for release of the breaker in embodiments where release of the breaker is effected by contact of the coating with water or other liquid. Access of water or other liquid to the capsule wall to initiate release of the the breaker may be retarded because of the coating of oil or wax. Optionally, the polymer that coats the breaker material may be chemically modified by selection of pendant functionality or surface treatment of the coated breaker, so that the coated breaker has an enhanced affinity to wet out an oily or waxy solvent. This further affinity serves to provide additional short term protection of the coating from contact with water or other liquid. A mixture of solvents is particularly contemplated in this embodiment, whereby a hydrophobic solvent that will have an affinity to the coated breaker may be provided together with a solvent that is more hydrophilic. The presence of the more hydrophilic solvent will serve to render the slurry more readily mixable with an aqueous fracturing fluid.

As a specific example, mineral oil has surprisingly been found to be an extremely suitable liquid for use in slurries of encapsulated breaker for most coating materials. Thus, polyurethane, polyurea, polyamides, poly(alkyl-2cyanoacrylates) coating materials, and the like have all been found to be stable with respect to mineral oil. Other liquids, such as hydrofluoroethers have also been found to be good liquids for use in formation of stable slurries of the present invention.

Particularly preferred solvents are non-hygroscopic solvents that provide a pumpable slurry under conditions of use. Examples of preferred solvents include mineral oil (such as drill mud oil), vegetable oil, canola oil, siloxanes, hydrofluoroethers and the like. Materials are preferably selected such that the material is pumpable even at freezing temperatures. Aliphatic solvents may additionally be used, such as alkanes or aliphatic mixtures including kerosene. In the case of solvents that have flash points that are too low, the effective flashpoint of the slurry composition may be adjusted by mixing of solvents.

Suspension aids suitable for use in the present invention include surfactants, and the like. Thickeners may additionally be incorporated into the slurry. A preferred class of suspension aids are thickeners, which include natural extracts such as gum arabic, gum ghatti, khaya gum, agar, pectin, carrageenin and alginates; modified natural extracts; various gums including guar gum, rhamsan gum, xanthan gums; modified cellulose, such as sodium carboxymethyl cellulose, methyl cellulose, and hydroxyalkylcelluloses; and synthetic polymers such as ultra high molecular carboxy vinyl (carbomers) and acrylic polymers; inorganic thixotropes such as fumed silica, thixotropic clays, and titanates; polysaccharides (e.g., celluloses, starches, alginates); and the like.

Preferably, the slurry composition will maintain a uniform suspension at room temperature for at least two weeks. More preferably, the slurry composition all will maintain a uniform suspension at room temperature for at least one month.

The breaker slurry composition preferably contains a surfactant. Surfactants provide enhanced stability of the slurry and even distribution of the particles suspended in the slurry, although the surfactant alone may not be sufficient to properly suspend the encapsulated breaker. Preferred surfactants include oxyalkylated phenolic resin surfactants, resin ester surfactants, polyol surfactants, alkylaryl sulfonate surfactants, polymeric amine surfactants, alcohol ether sulfonates, imidazoline cationic surfactants, complex phosphate esters, amine alkylaryl sulfonates, alkyl amidoamine surfactants, polyamido imidazoline surfactants, fatty imidazoline surfactants, dimer trimer acid surfactants, polyoxyethylated rosin amines, polyoxyethylated rosin amines, polyoxyethylene glycol surfactants, alcohol ether sulfonate surfactants, alcohol ether sulfate surfactants, sulfonate surfactants, sodium alpha olefin sulfonates, sodium alcohol ether sulfates, calcium alkylaryl sulfonates, amine dodecylbenzene sulfonates, fatty acid amides, alkanolamides, and mixtures thereof. Such surfactants are generally known as petroleum surfactants, generally commercially available from Witco Company. Other surfactants include fluorinated surfactants, such as the Fluorad™ surfactants from 3M.

Clays may be used in the slurry compositions of present invention, including smectic clays including modified montmorillonites, hectorites, and bentonites.

Proppants additionally may be provided in the slurry composition to assist in holding the fractured subterranean formation open after breaking and removal of the fracturing fluid. Proppants may be selected from any material appropriate for introduction downhole, including sand and sintered bauxite.

The slurry composition comprising the encapsulated breaker may additionally comprise adjuvants suitable for incorporation in breaker compositions, such as colorants, fragrances, preservatives, anti-settling agents, pH controlling buffers, and viscosity modifiers.

Typically, the fracturing fluid is a hydrated polymer such as guar, hydroxyalkylguar, hydroxyalkylcellulose, carboxyalkylhydroxyguar, carboxyalkylhydroxyalkylguar, cellulose or other derivatized cellulose, xanthan and the like in an aqueous fluid to which is added a suitable crosslinking agent. Suitable crosslinking agents include compounds such as borates, zirconates, titanates, pyroantimonates, aluminates and the like.

The encapsulated breaker of the present invention is preferably added to the fracturing fluid before the fluid is pumped downhole. In the preferred aspect of the present invention, the encapsulated breaker is extremely stable even in the presence of water at ambient conditions above ground, so the mixing with the fracturing fluid can be taken with due time and care without concern as to premature viscosity breakdown. Because the encapsulated breaker is provided as a slurry, it may be easily mixed with the fracturing fluid without the need to resort to solid metering devices. Most preferably, the slurry composition of the present invention is pumped simultaneously with the fracturing fluid downhole using liquid metering devices. Optional liquid mixing equipment to ensure even mixing of the two liquid streams may additionally be utilized.

The following examples are provided for purposes of illustrating the present invention, and are not intended to be limiting of the broadest concepts of the present invention. Unless otherwise indicated, all parts and percentages are by weight.

EXAMPLE

Example 1

A 1 L polymerization flask fitted with stainless steel baffles was charged with 300 mL of IPAR 3 drill mud oil (commercially available from Petro-Canada) and 80 g of industrial grade potassium persulfate (60–100 mesh). Over a period of about 20 minutes, 15 g ethyl-2-cyanoacrylate was added to the mixture. The persulfate salt was dispersed by stirring at 1500 RPM with a 6-blade turbine agitator. After stirring for about 10 minutes, 0.1 g of triethanolamine was added to the suspension. Stirring continued at room temperature for a further twenty minutes to ensure complete reaction of the cyanoacrylate. With continued stirring, 17 g of "Cab-O-Sil M-5" Silicon Dioxide was added to the mixture in order to provide a stable slurry of the coated persulfate particles.

Example 2

A 1 L tripore vessel fitted with stainless steel baffles was charged with 300 mL of hexanes and 80 g of industrial grade potassium persulfate (60–100 mesh). The persulfate salt was dispersed by stirring at 1500 RPM with a 6-blade turbine agitator. Over a period of about 20 minutes, 15 g Loc-tite™ 411 (85–90% ethyl cyanoacrylate, 10–15% poly (methyl methacrylate), 1–3% fumed amorphous silica (crystalline free), 0.1–1% phthalic anhydride, 0.1–0.5% hydroquinone, batch number 7KP023A) was added to the mixture, and after stirring for about 10 minutes, 0.1 g of triethanolamine was added to the suspension. Stirring continued at room temperature for a further twenty minutes to ensure complete reaction of the cyanoacrylate. The white powder was collected by filtration and re-dispersed in 350 mL of IPAR 3 drill mud oil along with 3 g of Fluorad™ FC-760 fluorochemical surfactant (available from 3M) at a mixing rate of 1430 RPM. A clay pre-gel comprised of 120 mL of IPAR 3 drill mud oil, 7.5 g of Tixogel™ MP150 clay and 3 g of a 95/5 propylene carbonate/water mixed under high shear (Omni-Mixer, Omni International, Waterbury, Conn.) for 20 minutes was added to the slurry of coated breaker and the mixture was stirred for a further 30 minutes to ensure a stable, uniform suspension.

What is claimed is:

1. An encapsulated breaker slurry composition comprising a) a breaker capable of reducing thc viscosity of a fracturing fluid enclosed within a coating, b) a liquid selected such that the overall slurry has a flashpoint above 93° C., wherein the liquid does not facilitate release of a uniform breaker from the coating, and c) a suspension aid in an amount sufficient to maintain the suspension of the encapsulated breaker in the liquid at room temperature for at least two weeks.

2. The encapsulated breaker slurry composition of claim 1, additionally comprising a proppant.

3. The encapsulated breaker slurry composition of claim 1, wherein said suspension aid comprises a surfactant.

4. The encapsulated breaker slurry composition of claim 1, wherein said suspension aid comprises clay.

5. The encapsulated breaker slurry composition of claim 1, wherein said coating is hydrolytically degradable.

6. The encapsulated breaker slurry composition of claim 1, wherein said coating is made from poly(alkyl-2-cyanoacrylate).

7. The encapsulated breaker slurry composition of claim 1, wherein said coating is selected from the group consisting of glass coatings, ceramic coatings, homopolymers and copolymers of polyolefin and ethylene oxides, polyamides, crosslinked cellulosic materials, polyureas, polyurethanes, dehydrated gums, and surfactant coatings.

8. The encapsulated breaker slurry composition of claim 1, wherein said liquid is an organic solvent.

9. The encapsulated breaker slurry composition of claim 8, wherein said organic solvent is predominantly aliphatic.

10. The slurry composition of claim 8, wherein said organic solvent is mineral oil.

11. The slurry composition of claim 8, wherein said organic solvent comprises a blend of one or more hydrocarbons.

12. The slurry composition of claim 3, wherein said surfactant is selected from the group consisting of oxyalkylated phenolic resin surfactants, resin ester surfactants, polyol surfactants, alkylaryl sulfonate surfactants, polymeric amine surfactants, alcohol ether sulfonates, imidazoline cationic surfactants, complex phosphate esters, amine alkylaryl sulfonates, alkyl amidoamine surfactants, polyamido imidazoline surfactants, fatty imidazoline surfactants, dimer trimer acid surfactants, polyoxyethylated rosin amines, polyoxyethylated rosin amines, polyoxyethylene glycol surfactants, alcohol ether sulfonate surfactants, alcohol ether sulfate surfactants, sulfonate surfactants, sodium alpha olefin sulfonates, sodium alcohol ether sulfates, calcium alkylaryl sulfonates, amine dodecylbenzene sulfonates, fatty acid amides, alkanolamides, fluorinated surfactants, and mixtures thereof.

* * * * *